United States Patent
Hamzeh et al.

(10) Patent No.: US 10,432,388 B2
(45) Date of Patent: Oct. 1, 2019

(54) HYBRID FULL DUPLEX COMMUNICATIONS IN A RADIO FREQUENCY CABLE NETWORK

(71) Applicant: CABLE TELEVISION LABORATORIES, INC, Louisville, CO (US)

(72) Inventors: Belal Hamzeh, Westminster, CO (US); Thomas H. Williams, Longmont, CO (US); Daniel Rice, Boulder, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/175,008

(22) Filed: Oct. 30, 2018

(65) Prior Publication Data

US 2019/0068354 A1    Feb. 28, 2019

Related U.S. Application Data

(60) Division of application No. 15/700,951, filed on Sep. 11, 2017, now Pat. No. 10,148,408, which is a continuation of application No. 15/019,686, filed on Feb. 9, 2016, now Pat. No. 9,762,377.

(60) Provisional application No. 62/234,085, filed on Sep. 29, 2015.

(51) Int. Cl.
*H04L 5/14* (2006.01)
*H04L 5/00* (2006.01)
*H04L 12/28* (2006.01)
*H04N 21/61* (2011.01)
*H04B 3/32* (2006.01)
*H04B 3/487* (2015.01)

(52) U.S. Cl.
CPC ............. *H04L 5/1469* (2013.01); *H04B 3/32* (2013.01); *H04B 3/487* (2015.01); *H04L 5/0078* (2013.01); *H04L 12/2885* (2013.01); *H04L 12/2898* (2013.01); *H04N 21/6118* (2013.01)

(58) Field of Classification Search
CPC . H04L 5/1469; H04L 5/0078; H04L 12/2885; H04L 12/2898; H04N 21/6118
See application file for complete search history.

(56) References Cited

U.S. PATENT DOCUMENTS

2017/0019241 A1*  1/2017  Jin ..................... H04L 5/1461

* cited by examiner

*Primary Examiner* — Duc C Ho
(74) *Attorney, Agent, or Firm* — Armstron Teasdale LLP

(57) ABSTRACT

Systems and methods presented herein provide for improved duplex communications in an RF cable network comprising a plurality of CMs. In one embodiment, a system includes a CMTS operable to transmit downstream communications to the CMs and to process upstream communications from the CMs. The system also includes a duplex RF communication path between the CMTS and the CMs. The CMTS is further operable to transmit a control signal that directs a first of the CMs to transmit, to direct the remaining CMs to receive the transmission from the first CM, to direct the CMs to report received power levels of the transmission from the first CM, and to calculate RF isolations of the remaining CMs with respect to the first CM based on the reported power levels.

8 Claims, 17 Drawing Sheets

HYBRID FULL DUPLEX COMMUNICATIONS IN A RADIO FREQUENCY CABLE NETWORK

CROSS-REFERENCE TO RELATED APPLICATIONS

This application is a divisional of U.S. application Ser. No. 15/700,951, filed Sep. 11, 2017, which prior application was a continuation of U.S. application Ser. No. 15/019,686, filed Feb. 9, 2016, now U.S. Pat. No. 9,762,377, which application claims the benefit of U.S. provisional Application No. 62/234,085, filed Sep. 29, 2015, the disclosures of which are incorporated in their entirety by reference herein.

BACKGROUND

A duplex communication system is a point-to-point system composed of two connected parties or devices that can communicate with one another in both directions. Generally, a duplex system has two clearly defined data transmission channels, with each channel carrying information in one direction. In a full duplex system, both parties/devices can communicate with each other simultaneously using the same physical spectrum channels.

In a (Radio Frequency) RF cable network, full duplex communications can be more difficult to achieve due to the number of "downstream" devices and the network configuration. For example, a Cable Modem Termination System (CMTS) is typically coupled to a plurality of downstream Cable Modems (CMs). Each of the CMs can transmit "upstream" along the same path to the CMTS while the CMTS transmits its downstream communications to the CMs. The CMs and the CMTS generally use different spectral bands. The CMs can also transmit at specific coordinated times. However, because many CMs are transmitting to the CMTS, they tend to interfere with one another as well as with the CMTS if they are not separated in time and spectrum bands, as required in Frequency Division Duplex (FDD), Time Division Multiple Access (TDMA), and Time Division Duplex methods currently practiced.

SUMMARY

Systems and methods presented herein provide for improved duplex communications in an RF cable network. The embodiments herein illustrate how upstream and downstream transmissions can be received correctly in the presence of one another and in the same spectrum channels. Full duplex communication is achieved over the channel while creating full duplex functionality in a single device, rather than requiring all devices support full duplex functionality and associated interference cancellation. The impact of upstream transmission from the CMs on downstream transmission is mitigated so as to ensure that the downstream transmissions to the CMs are received correctly, and vice versa.

In one embodiment, a system is operable in a Radio Frequency (RF) cable network comprising a plurality of CMs. The system includes a CMTS operable to transmit downstream communications to the CMs and to process upstream communications from the CMs. The system also includes a duplex RF communication path between the CMTS and the CMs. The CMTS is further operable to transmit a control signal that directs a first of the CMs to transmit, to direct the remaining CMs to receive the transmission from the first CM, to direct the CMs to report received power levels of the transmission from the first CM, and to calculate RF isolations of the remaining CMs with respect to the first CM based on the reported power levels.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
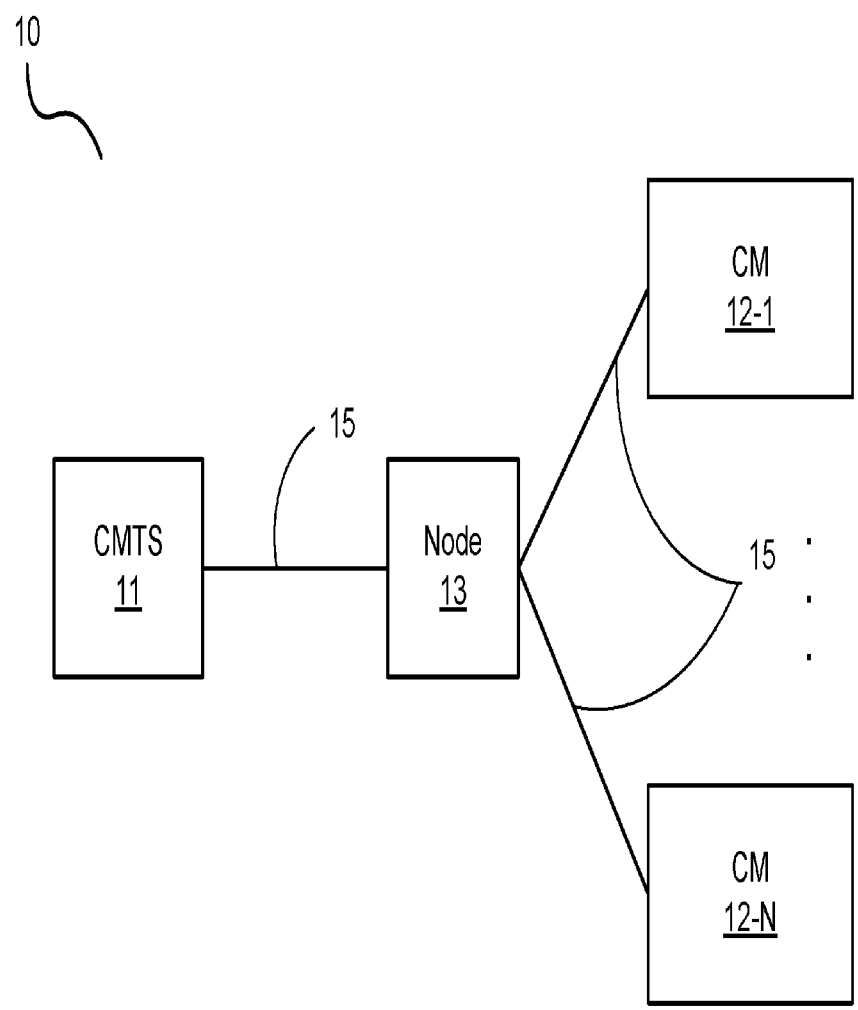
FIG. 1 is a block diagram of an exemplary communication system in an RF cable network.

FIG. 1 is a block diagram of an exemplary communication system 10 in an RF cable network. The communication system 10 includes a CMTS 11 and a plurality CMs 12-1-12-N (where "N" represents an integer greater than "1" and not necessarily equal to any other "N" reference designated herein). The CMTS 11 is communicatively coupled to the CMs 12 through a duplex communication link 15. Generally, the CMTS 11 is coupled to the CMs 12 via a node 13 that combines the upstream communications of the CMs 12 to the CMTS 11. The CMTS 11 also provides downstream communications to the CMs 12 through the duplex communication link 15.

The CMTS 11 is any system, device, software, or combination thereof, typically located in a cable company's hub site, or "headend", which is used to provide high speed data services (i.e., the downstream transmissions), such as cable Internet and Voice over Internet Protocol, to the CMs 12. The CMs 12 are generally network bridges and modems that provides bi-directional data communication via radio frequency channels on a Hybrid Fiber-Coaxial (HFC) or Radio Frequency over Glass (RFoG). The CMs 12 are used to deliver broadband Internet access in the form of cable Internet, taking advantage of the high bandwidth of a HFC and RFoG network.

The CMTS 11 is operable to configure the CMs 12 to communicate via cable protocol (e.g., Data Over Cable Service Interface Specification, or "DOCSIS") specification. In this regard, the CMTS 11 is operable to send control signals that direct the CMs 12 to operate in a particular manner with respect to the employed cable protocol. In one embodiment, the CMTS 11 is operable to calibrate the CMs 12 and periodically determine certain characteristics of the CMs 12. For example, the CMTS 11 may send a control signal to each of the CMs 12 to determine their RF isolations with respect to the CMTS 11 as well as their RF isolations with respect to one another. CMs 12 having greater RF isolations are less likely to interfere with one another during duplex transmissions with the CMTS 11, thereby improving duplex communications between the CMTS 11 and the CMs 12.

To illustrate, full duplex transmission is achieved by having the CMs transmit to the CMTS 11 at the same time the CMTS 11 is transmitting to the CMs 12 using the same bands. The embodiments herein describe how the upstream/downstream transmissions can be received correctly in the presence of other upstream/downstream transmissions. In one embodiment, a hybrid full duplex communications are achieved while creating full duplex functionality in a single device (i.e., a CM 12), rather than having all of the CMs 12 support full duplex functionality.

For downstream transmissions to be received correctly by the CMs 12, the impact of the upstream transmissions from the CMs 12 on the downstream transmission from the CMTS 11 are mitigated by utilizing inherent CM to CM isolation in the communication system 10. The CMTS 11 uses knowledge of the RF isolations between various devices (e.g., the CMs 12) and performs CM transmission scheduling such that if a CM 12 is receiving a downstream transmission, then the CMTS 11 allows transmission for CMs 12 that have an acceptable RF isolation (e.g., a threshold RF isolation) between them. Additional operational details regarding the communication system 10 are shown and described in the flowchart of FIG. 2.

Figure 2:
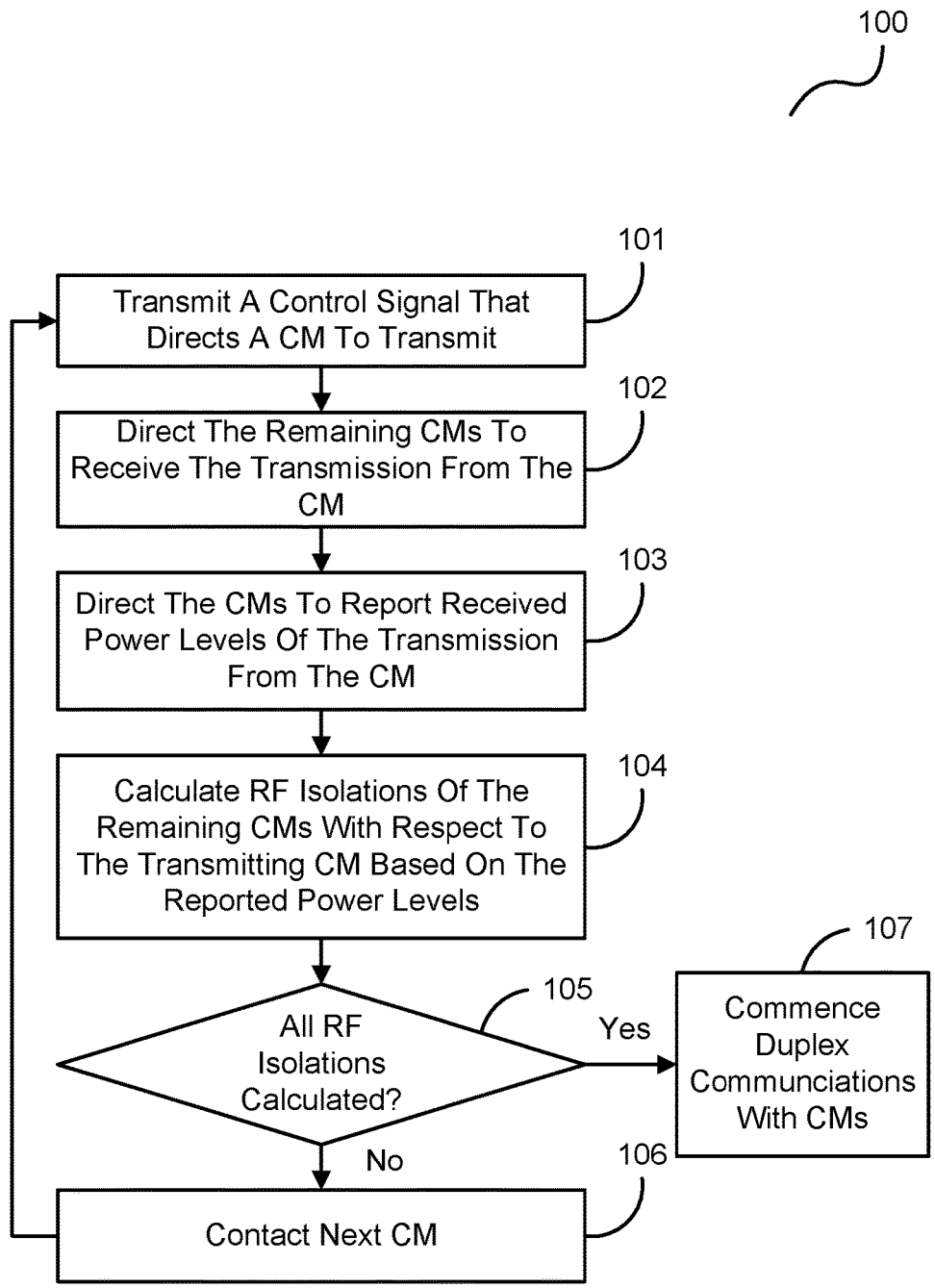
FIG. 2 is a flowchart of an exemplary process of the communication system of FIG. 1.

In FIG. 2, the process 100 initiates when the CMTS 11 transmits a control signal that directs a CM 12 to transmit, in the process element 101. The CMTS 11 then directs the remaining CMs 12 coupled to the node 13 to receive the transmission from the CM 12, in the process element 102. For example, the CMTS 11 transmits a control signal to the CM 12-1 that directs the CM 12-1 to begin transmitting. Then the CMTS 11 transmit control signals to the remaining CMs 12-2-12-N to direct the CMs 12-2-12-N to receive the transmission from CM 12-1.

The CMTS 11 then directs the CMs 12-2-12-N to report to receive power levels of the transmission from the CM 12-1, in the process element 103. Based on this, the CMTS 11 calculates the RF isolations of the remaining CMs 12-2-12-N with respect the transmitting CM 12-1, in the process element 104. The CMTS 11 then determines whether all of the RF isolations have been calculated for the CMs 12, in the process 105. If so, then the CMTS 11 commences duplex communications with the CMs 12 having the acceptable RF isolation, in the process element 107. Otherwise, the CMTS 11 contacts the next CM 12 in the group connected to the node 13, in the process element 106. The CMTS 11 continues the process until each of the RF isolations of the CMs 12 have been calculated (e.g., by returning to the process element 101).

The CMTS 11 manages a list of the CMs 12 and their RF isolations so as to choose which CMs 12 may perform full-duplex communications with the CMTS 11. CMs not meeting the threshold level of RF isolation are directed by the CMTS 11 to operate in a time shared and/or frequency shared simplex operation. To illustrate, assume that the CMTS 11 has determined RF isolations for a group of six CMs 12 that are connected to the node 13. The CMTS 11 after performing the process 200 determines that RF isolations of the other CMs 12 with respect to the CM12-1 are as follows CM 12-2: RF isolation equals 74 dB
CM 12-3: RF isolation equals 66 dB
CM 12-4: RF isolation equals 45 dB
CM 12-5: RF isolation equals 70 dB
CM 12-6: RF isolation equals 73 dB Now assume that the threshold RF isolation between the CMs 12-1-12-6 operating in full-duplex mode is 62 dB. Then, when CM 12-1 is receiving data from the CMTS 11, any of CM 12-2, CM 12-3, CM 12-5, and CM 12-6 are allowed to transmit. However, the CM 12-4 is not allowed to transmit, as any transmission from that device could adversely impact the downstream signal being received by CM 12-1.

Generally, the threshold value of RF isolation for concurrent operation is left to the network operator to decide based on transmission characteristics and channel conditions. The threshold value can be a global value applicable to all of the CMs 12, or it can be defined with more granularity for various subsets and combinations of devices.

Figure 3:
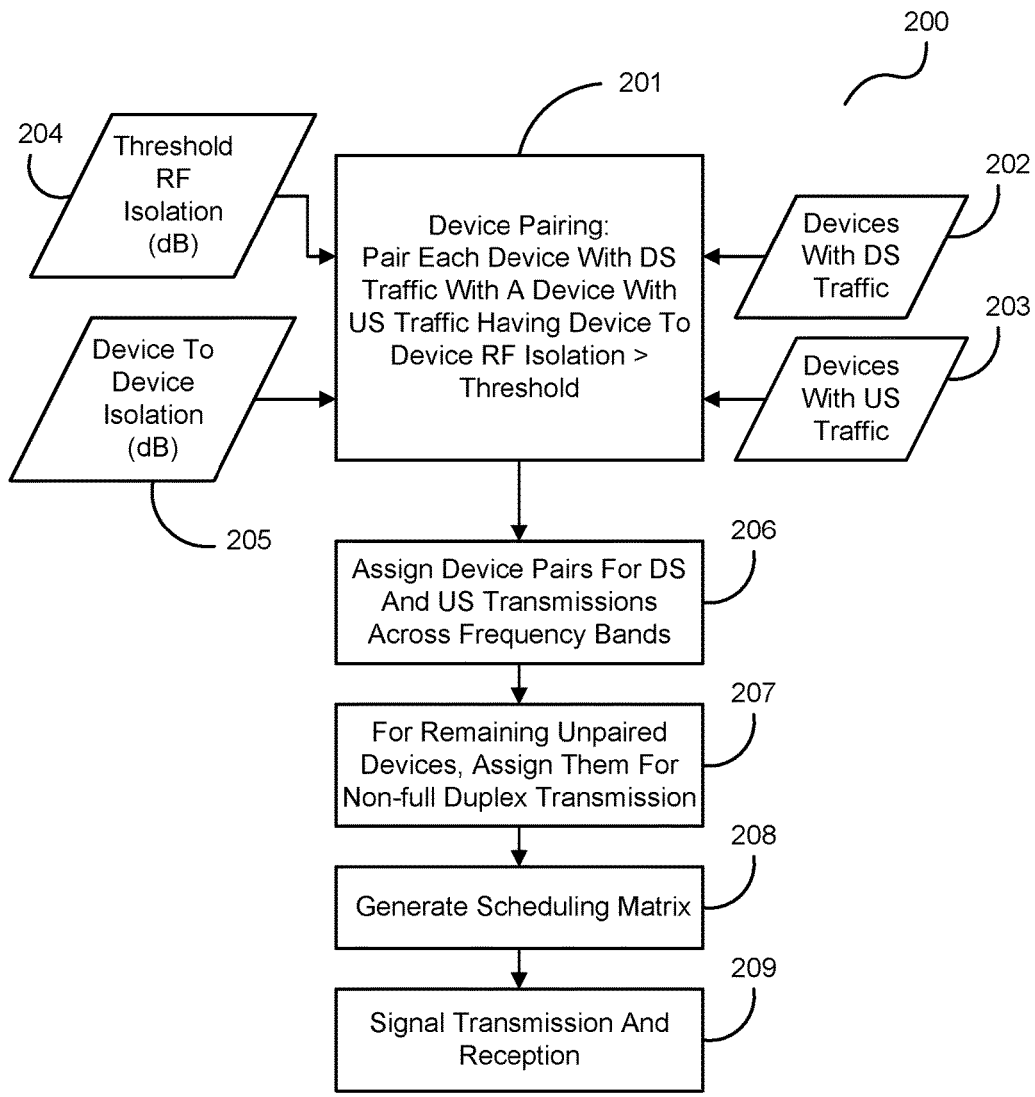
FIG. 3 is a flowchart of another exemplary process of the communication system of FIG. 1.

FIG. 3 is a flowchart of another exemplary process 200 of the communication system 10 of FIG. 1. In this embodiment, the CMTS 11 establishes a threshold RF isolation for the CMs 12 to operate in full-duplex mode, in the process element 204. As with the process 100 of FIG. 2, the CMTS 11 determines a device to device RF isolation, in the process element 205. That is, the CMTS 11 determines the RF isolations between each of the CMs 12-1-12-N coupled to the node 13.

The CMTS 11 may also determine which of the CMs 12 are to receive downstream traffic from the CMTS 11, in the process element 202, and determine which of the CMs 12 have upstream traffic intended for the CMTS 11, in the process element 203. With these inputs, the CMTS 11 may then perform a device pairing for each CM 12 receiving downstream traffic and transmitting upstream traffic while meeting the threshold level of RF isolation, in the process element 201.

Once the device pairing is completed, the CMTS 11 then assigns device pairs for downstream and upstream transmissions across various frequency bands in the duplex communication link 15, in the process element 206. For the remaining unpaired CMs 12, the CMTS assigns them to "non-full" duplex transmissions, in the process element 207. For example, the CMs 12 may be directed to perform simplex communications on a time shared and/or frequency shared basis. The CMTS 11 then generates a scheduling matrix that directs the CMs 12 to communicate accordingly (i.e., either as full-duplex or non-full-duplex), in the process element 208. Thereafter, communications between the CMTS 11 and the CMs 12 are transmitted and received, in the process element 209.

Figure 4:
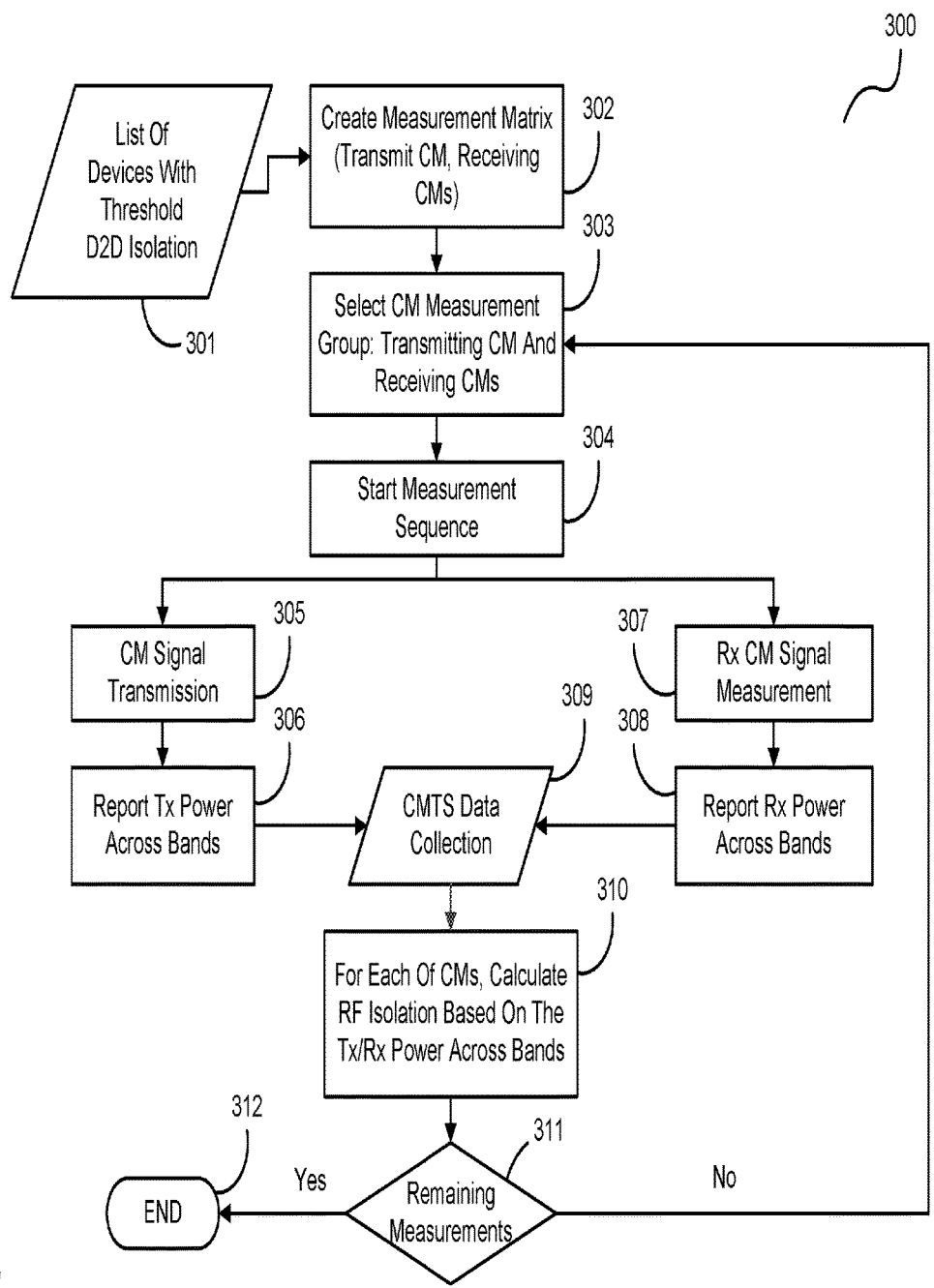
FIG. 4 is a flowchart of another exemplary process of the communication system of FIG. 1.

FIG. 4 is a flowchart of another exemplary process 300 of the communication system 10 of FIG. 1. In this embodiment, the CMTS 11 receives a list of devices (e.g., CMs 12) that meet the threshold RF isolation with respect to each other, in the process element 301. The CMTS 11 then generates a measurement matrix for transmitting and receiving to/from the CMs 12, in the process element 302. That is, the CMTS 11 generates a matrix that determines which of the CMs 12 meet the requisite RF isolation for commencing full-duplex operations. Then, the CMTS 11 selects a group of CMs 12, in the process element 303, to commence full duplex transmission and reception with the CMs 12.

Periodically (e.g., during low traffic periods), the CMTS 11 starts the measurement sequence again, in the process element 304, to re-verify the RF isolations of the CMs 12, in the process element 304. In this regard, the CMTS 11 directs the CMs 12 to transmit to the CMTS 11, in the process element 305, such that the CMs 12 can report their transmit power levels across the frequency bands of the duplex communication link 15, in the process element 306. Similarly, the CMTS 11 will direct the CMs 12 to determine the received power levels across the frequency bands of the duplex communication link 15 and report those power levels to the CMTS 11, in the process elements 307 and 308.

The CMTS 11 collects this data, in the process element 309, and for each of the CMs 12, the CMTS 11 calculates the RF isolation between each of the CMs 12 based on the transmit and receive power levels across the frequency bands of the duplex communication link 15, in the process element 310. If there are remaining RF isolation measurements to be made (process element 311), then the CMTS 11 continues measuring the RF isolations of any remaining CMs 12 connected to the node 13. Otherwise, the process ends in the process element 312 and the CMTS 11 commences communications with the CMs 12.

Figure 5:
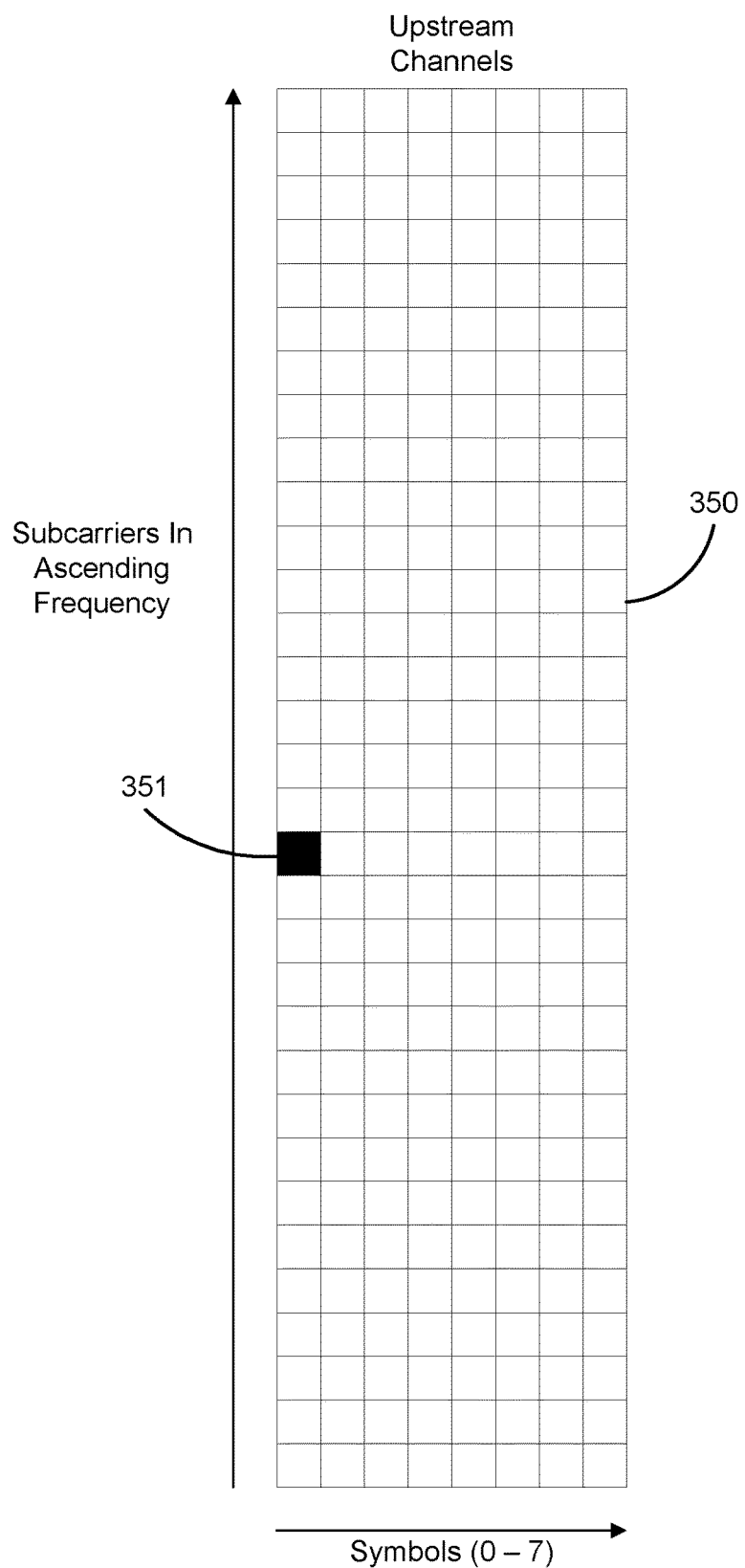
FIG. 5 illustrates an exemplary ranging probe used to generate a gap in time in the downstream channels.

FIG. 5 illustrates exemplary ranging probes 351 used to generate a gap in time in the downstream channels for training and calibration purposes. For example, the plot 350 illustrates upstream subcarriers and sending frequency versus data symbols being transmitted by the subcarriers. Ranging probes 351 may be implemented during the symbol transmissions to direct the CMs 12 to initiate training and calibration. This training calibration process may be used to direct the CMs 12 to implement their RF isolation measurement processes described above.

During this training calibration, the CMTS 11 schedules an upstream quiet period so that a downstream probe signal 351 transmitted can be heard by its own upstream receiver. This downstream probe signal 351 may be utilized to determine the distortion of signal received by the CMTS 11 such that interference cancellation may be implemented and optimized. To generate a quiet period, the CMTS 11 may schedule a transmission of a ranging probe 351 to the Null SID (Service ID). In such an embodiment, the CMs 12 are not assigned the Null SID and a transmission resulting in a gap in energy during that period does not occur.

During the quiet period, the CMTS 11 transmits downstream and listens at the upstream receive port for upstream communications by the CMs 12. The CMTS 11 then compares the downstream transmitted signal with the downstream received signal at the upstream receive port. The CMTS 11 then determines a transfer function H(f) in the transmission path. Along with the transmitted signal, an opposing transmit signal (e.g., 180° out of phase) Tx is generated for signal cancellation purposes.

Once the CMTS 11 determines the transfer function H(f), the transfer function is represented as a digital filter G(f). The CMTS 11 then utilizes the digital filter G(f) to modify the negated downstream transmit signal and creates a signal that can cancel the downstream transmit signal. This process may occur periodically in response to changes in the network.

Figure 6:
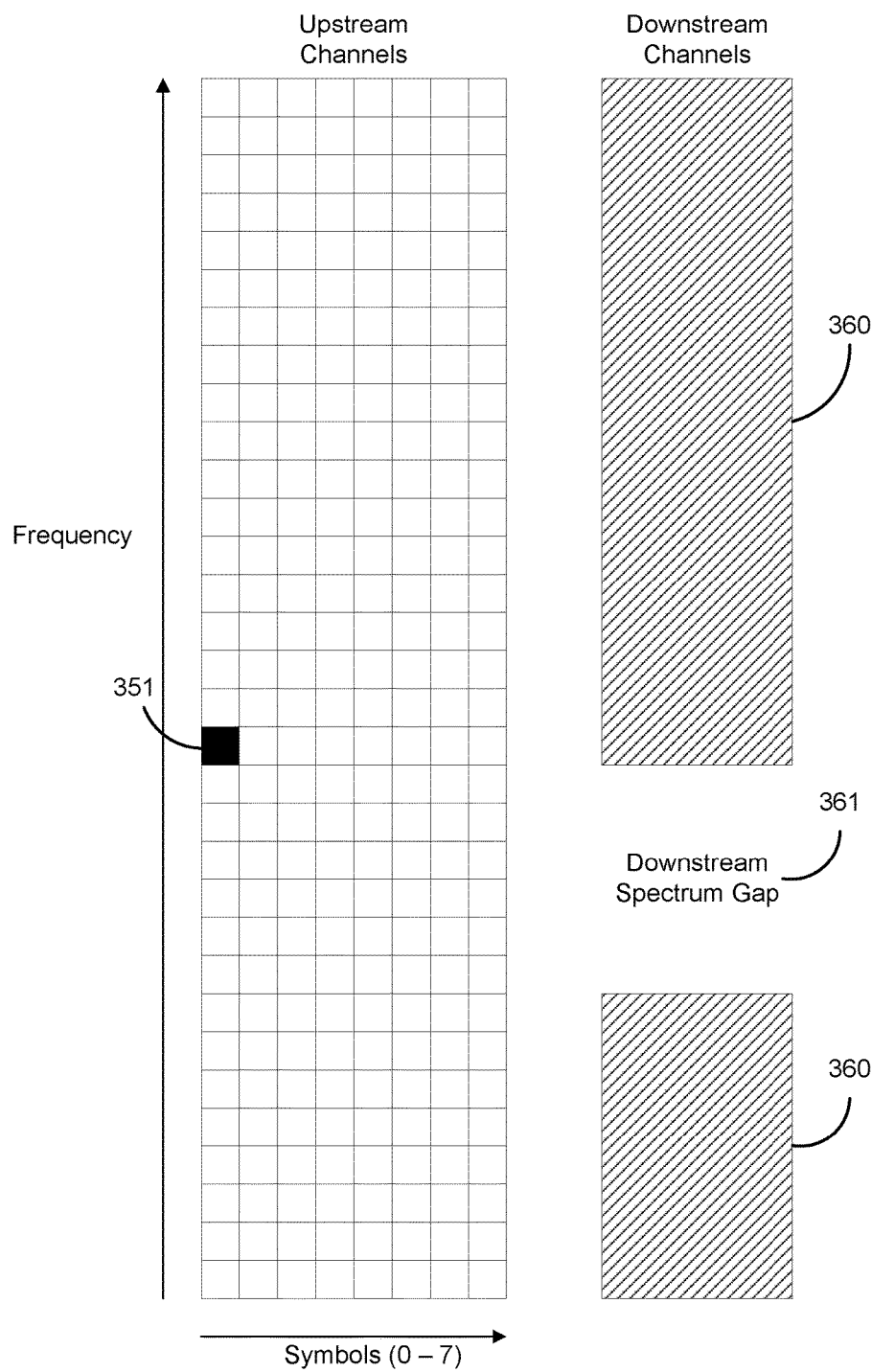
FIG. 6 illustrates exemplary band specific upstream probes matched to downstream frequency gap.

FIG. 6 illustrates exemplary band specific upstream probes 351 matched to downstream spectrum gap 361. At the CM 12, the training process is somewhat more elaborate. For example, a partially intrusive training process may be utilized to achieve a steady state in the CMs 12. In this approach, the CMTS 11 generates excluded sub-bands 360, which results in one or more spectrum gaps 361 at the sub-band frequencies during periods determined by the CMTS 11. At these spectrum gaps 361, the CMTS 11 commands different CMs 12 to transmit a probe 351.

Even though the CMTS 11 has generated an spectrum gap 361, a CM 12 will listen in that spectrum gap 361 on the CM 12's downstream port for the probe 351 transmitted by the CM 12. These new band specific probes 351 provide for a full duplex DOCSIS implementation that is more efficient and limits interference.

Figure 7:
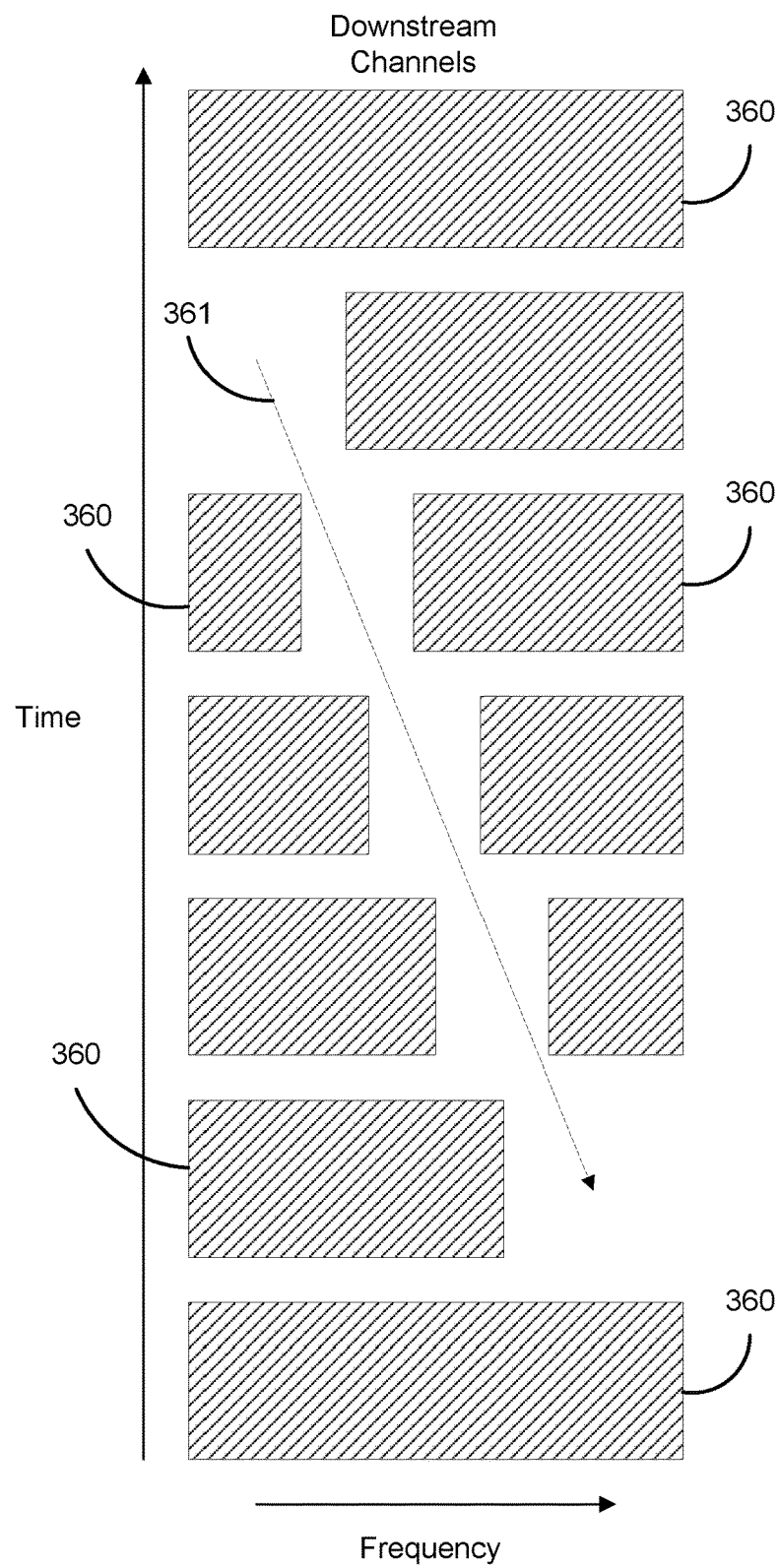
FIG. 7 illustrates exemplary spectrum gaps as a function of time.

FIG. 7 illustrates exemplary spectrum gaps 361 as a function of time. In this embodiment, the CMTS 11 schedules the spectrum gaps 361. The CMTS 11 shifts the frequency of the exclusion band as a function of time until the exclusion band has stepped through the entire spectrum. To facilitate the calibration process for the CMs 12, the CMTS 11 transmits data instructing the CMs 12 when the calibration process begins, the duration of the gaps in time (e.g., as in symbols), frequencies of the gaps 361, frequency widths of the gaps 361, and when the bandgap scanning phase concludes. This is generally a dynamic process that allows for cable plant (e.g., headend/hub) variability capable of impacting calibration parameters. This scanning phase process may repeat periodically.

Figure 8:
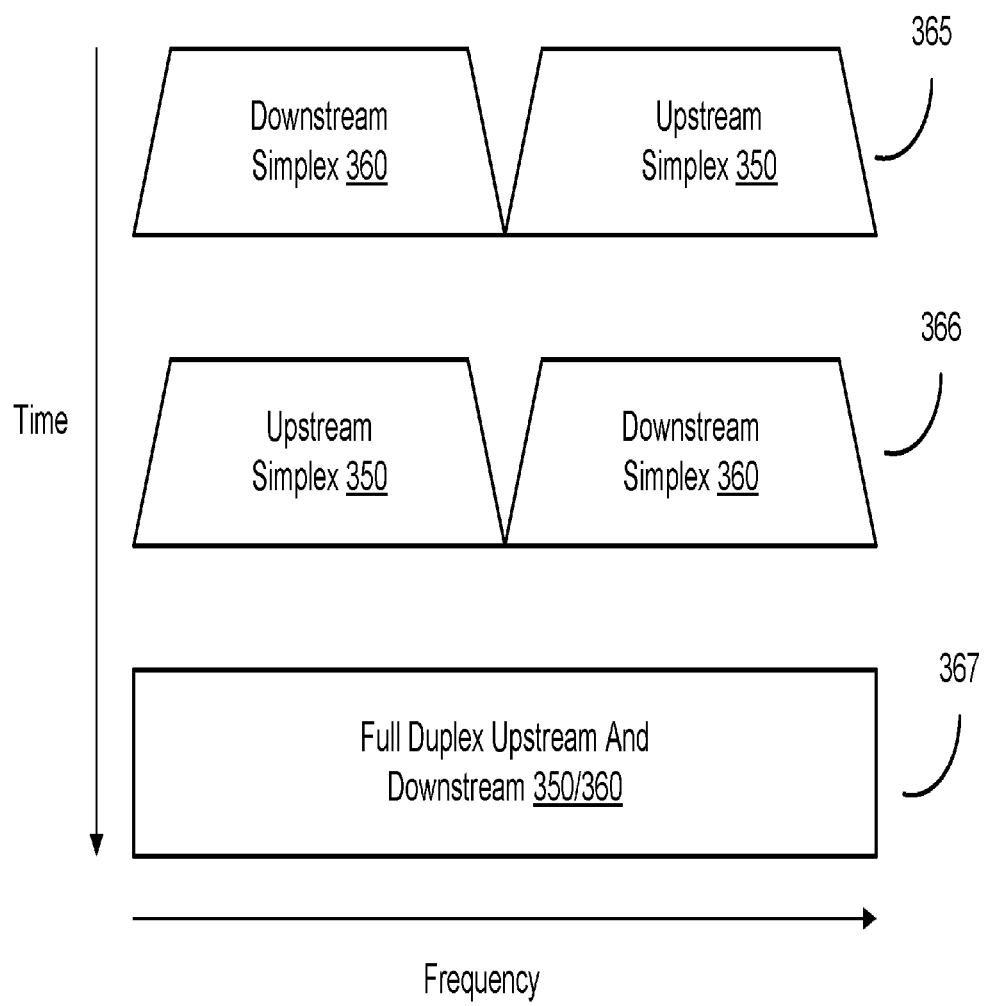
FIG. 8 illustrates an exemplary frequency allocation during initialization and low traffic periods.

FIG. 8 illustrates an exemplary frequency allocation during initialization and low traffic periods. For example, some training and calibration mechanisms leverage a brief period of simplex operation. In one channel, either downstream or upstream transmissions can occur, but not both at the same time. These periods may take place during an initialization or when in steady state during a low traffic period. For calibration of the CMTS 11, the CMTS 11 can schedule quiet periods and sense the impact of downstream transmission at an upstream receive port. During period 365, the CMTS 11 transmits a downstream low frequency signal that is received in the upstream port at the CMTS 11 to estimate low frequency transfer function. The CM 12 transmits an upstream high frequency signal that is received in the downstream port at the CM 12 to estimate high frequency transfer function of the CM 12. During period 366, the CMTS 11 transmits a downstream high frequency signal that is received in the upstream port at the CMTS 11 to estimate the high frequency transfer function of the CMTS 11. The CM 12 transmits an upstream low frequency signal that is received in the downstream port at the CM 12 to estimate low frequency transfer function of the CM 12. This completes the low and high transfer functions at the CMTS 11 and the CM 12 to assist in interference cancellation such that full duplex communications can occur in period 367.

In order to facilitate time coordination, the same cyclic prefix and subcarrier spacing may be selected in the upstream and downstream transmissions. Since the downstream and upstream transmissions occupy the same spectrum in Full Duplex (FD), the cyclic prefix and windowing parameters defined in FD-DOCSIS can be the same for the upstream and downstream transmissions as a superset of the DOCSIS 3.1 upstream and downstream cyclic prefix and windowing parameters.

Figure 9:
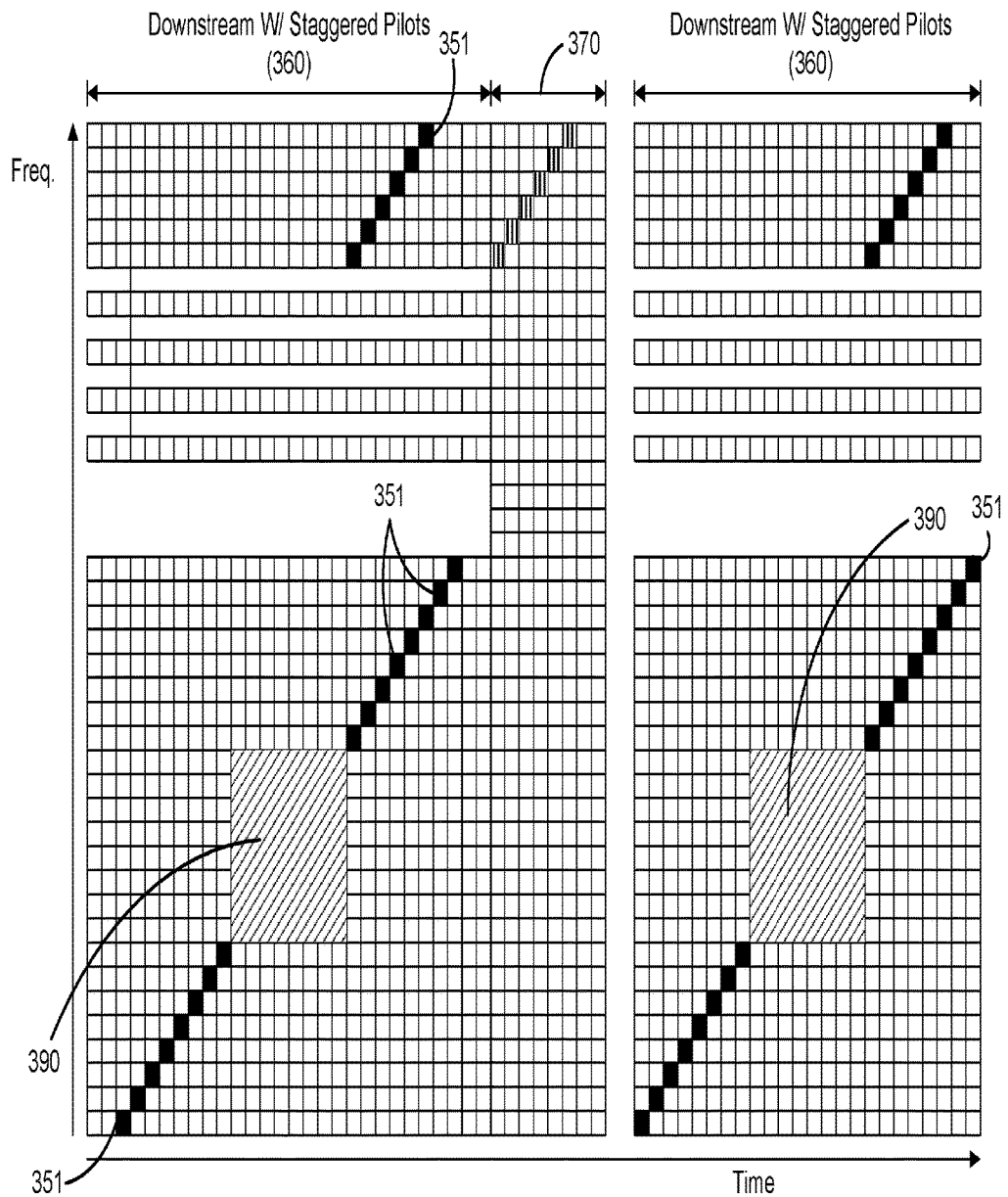
FIG. 9 illustrates exemplary upstream probes superimposed in time and frequency to downstream 50 KHz scattered pilot signals.
Figure 10:
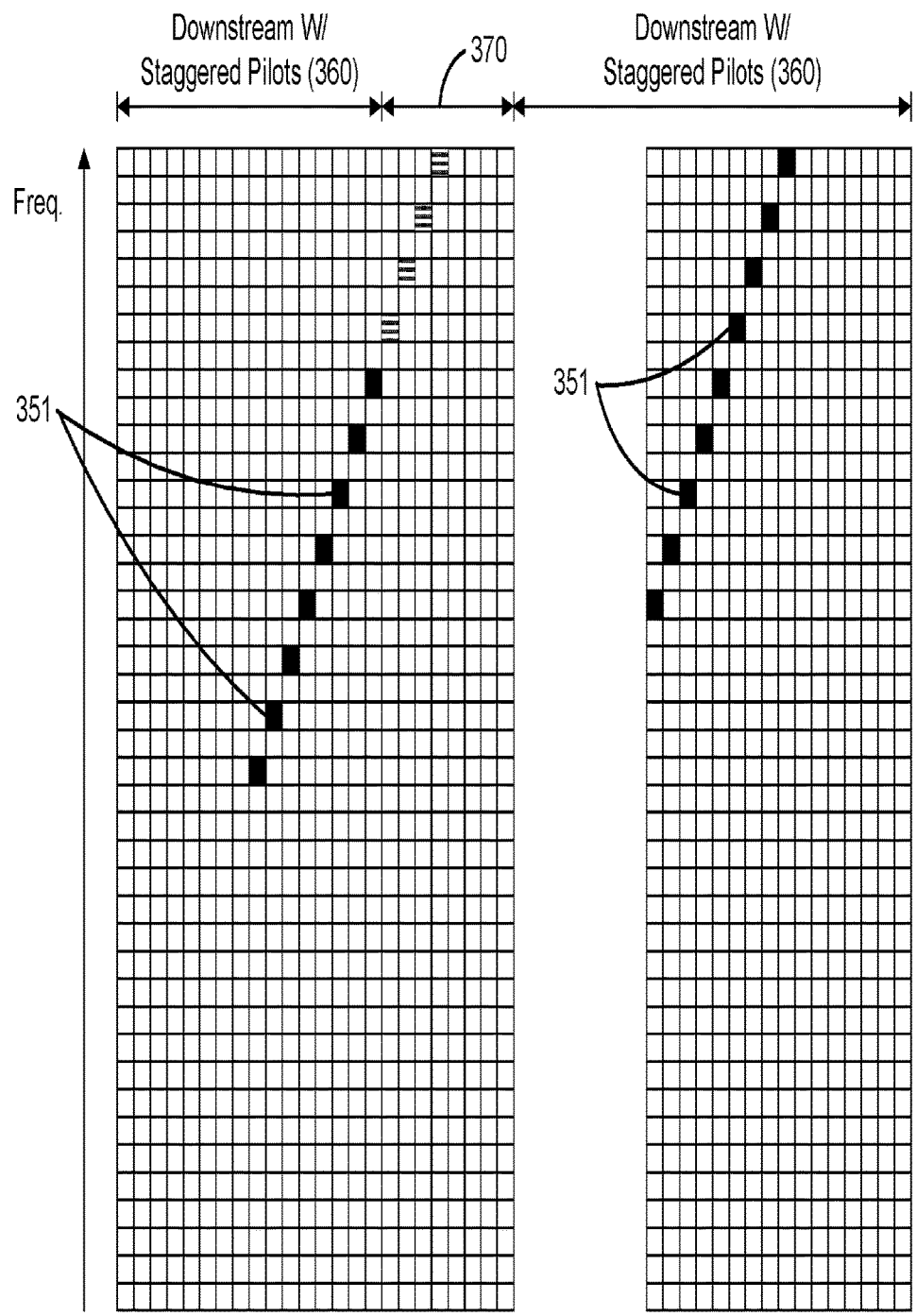
FIG. 10 illustrates exemplary upstream probes of 25 KHz subcarrier spaced downstream and upstream channels superimposed in time and frequency to a downstream channel, wherein the upstream probes of a CM coincide with the downstream pilots.

FIG. 9 illustrates exemplary upstream probes 351 superimposed in time and frequency to downstream 50 KHz scattered pilot signals. FIG. 10 illustrates exemplary upstream probes 370 of 25 KHz subcarrier spaced downstream and upstream channels superimposed in time and frequency to a downstream channel, wherein the upstream probes 370 of a CM 12 coincide with the downstream pilots. No probes are asserted during the transmission of the Physical-layer Link Channel (PLC) 390.

In this embodiment, an alternate upstream probe is used to facilitate training when the probe 351 of a CM 12 coincides with a portion of the downstream scattered or staggered pilot signals. For example, in DOCSIS 3.1, the staggered downstream pilot location is based on whether the subcarrier spacing is 25 KHz or 50 KHz. If the subcarrier spacing is 50 KHz (downstream 4 KHz Fast Fourier Transform—"FFT"), the staggering changes by one subcarrier for every symbol that changes in time. In the case of a 25 KHz downstream 8K FFT configuration, the subcarrier position of the pilot signal increases by two subcarriers for every symbol that changes in time, as shown in FIG. 10. In order to have upstream probes achieve a superposition in time and frequency, the probes 351 follow the behavior of the pilot signals during the period in which they overlap. The upstream probes 370 are then configured to traverse subcarriers to match the downstream pilot signals.

In full duplex operation there may also be interference issues when two or more neighboring CMs 12 interfere with each other. Such may be the case when there is poor RF isolation between CMs 12 (e.g., when CMs 12 share the same tap). When two CMs 12 are connected to one or more drop cables from the same tap, there is a higher likelihood of interference. These (and other) CMs 12 may have high error rates due to interference. After switching the CMs 12 to a legacy simplex mode, these CMs 12 may be analyzed to determine if the CMs 12 share a tap and/or if they have a high likelihood of interfering with one other. When there is interference, these interfering devices may be grouped into "interference groups."

CMs 12 in the same interference group are isolated from each other via scheduling. For example, a CM12 in an interference group will not be scheduled to transmit upstream data at the same time downstream data is scheduled to be received by another CM 12 in the same interference group. Additionally, when the CMTS 11 is sending and/or broadcasting administration messages pertaining to the CMs 12 in an interference group, no upstream data is scheduled for transmission from any member of the interference group. It should be noted that the CMTS 11 does not schedule upstream transmissions over spectrum occupied by the PLC channel 390.

Figures 11A, 11B:
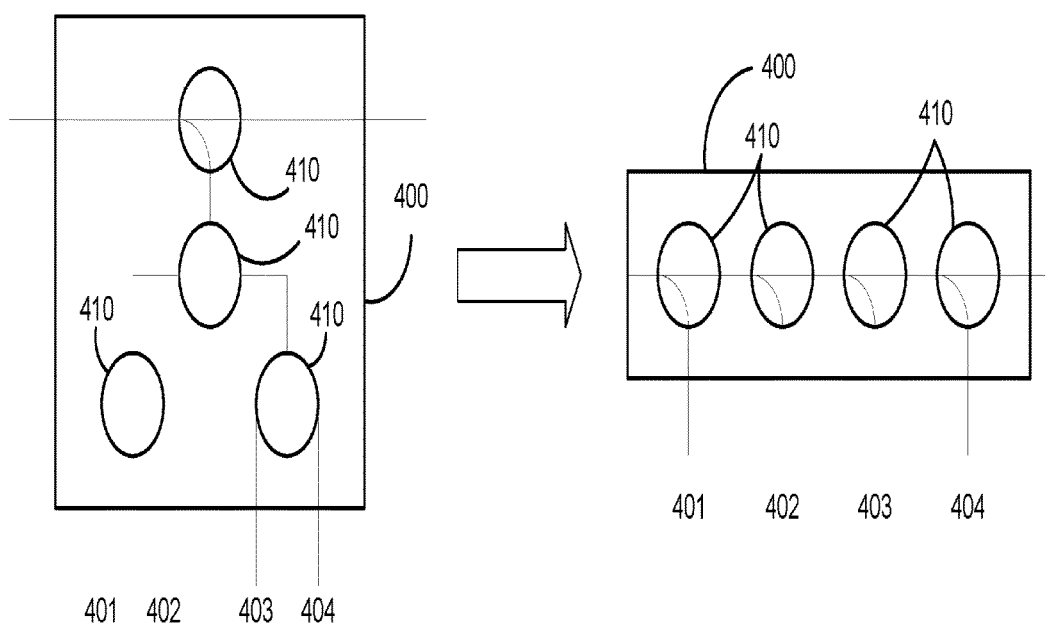
FIGS. 11A-11B are block diagrams of exemplary four way tap designs utilizing attenuation at drop ports to increase isolation.

To assist in RF isolation, tap designs can be reconfigured. FIGS. 11A-11B are block diagrams of exemplary four way tap designs attenuating at drop ports 401-404 to increase RF isolation. For example, FIG. 11A illustrates one 4 way tap 400 where downstream signals are split off to ports 401-404 using RF couplers 410. FIG. 11B illustrates an alternative, more serial approach to implementing the 4 way tap. This alternative approach improves RF isolation by reducing the splitting that takes place inside the tap 400 from cascading couplers instead of following couplers 410 by a splitter. Other tap designs (e.g., 2 way, 8 way, etc.) may be used and implemented in similar fashion.

Lower tap values may further improve the RF isolation. For example, lower tap values have lower RF isolation performance than the higher tap values. If minimum tap values of 14 dB, 17 dB and 20 dB are used for 2, 4 and 8 way taps, respectively, the minimum RF isolation would be increase and the maximum insertion loss would decrease.

The full duplex system may be formed with network nodes each configured with a PHY cancellation enhancement sub-system and a digital self-cancellation sub-system. The PHY cancellation enhancement sub-system produces the first order cancellation while the second phase cancellation further removes the effect of the transmit signal such that the receive signal can be recovered while the transmit signal is on.

Figure 12A:
FIGS. 12A-12D illustrate exemplary variable upstream and downstream bandwidths switchable to half-duplex or full-duplex operation.
Figure 12B:
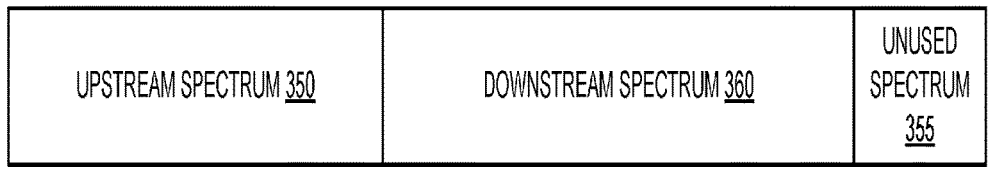
Figure 12C:
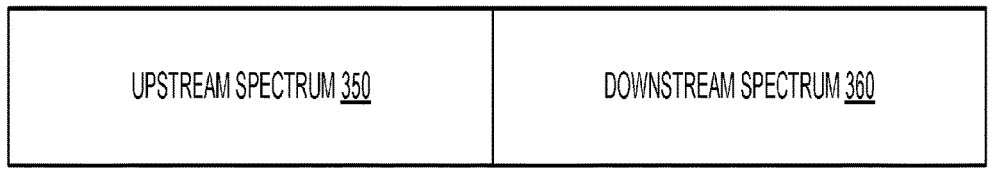
Figure 12D:
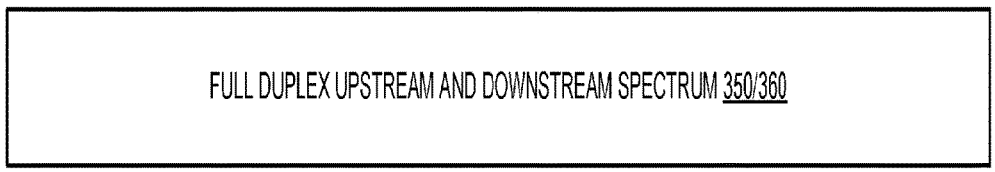

FIGS. 12A-12D illustrate exemplary variable upstream and downstream bandwidths switchable to half-duplex or full-duplex operation. For example, a half-duplex or a full-duplex system may not operate in half-duplex or full-duplex mode unless the spectrum is available. In FIG. 12A, the RF communication link 15 may be configured so as to separate upstream transmissions 350 from downstream transmissions 360. This link may also include an unused portion 355 of the spectrum. The upstream transmissions 350 and the downstream transmissions 360 are variable across the spectrum. As spectrum is needed, the upstream transmission 350 and downstream transmission 360 portions are pushed into the unused portion 355, as illustrated in FIG. 12B, until there is no more unused portion of spectrum, as illustrated in FIG. 12C. But the upstream transmissions 350 and the downstream transmissions 360 are still separate. If the system requires additional spectrum the CMTS 11 can direct the CMs 12 to switch to half or full duplex as illustrated in FIG. 12D.

The embodiments herein provide full duplex communications over a channel while creating full duplex functionality in a single device, rather than requiring all devices support full duplex functionality and associated interference cancellation. In one embodiment, simultaneous transmission and reception of data is assisted through the use of signal cancellation. For example, a transmitting device may improve reception of a received signal by canceling the transmitted signal at the transmitting device's receive port. Thus, an interference canceller can be configured at the receive port of the CMTS 11 to cancel out the downstream communications of the CMTS 11 from the upstream communications received from the CMs 12.

Figure 13:
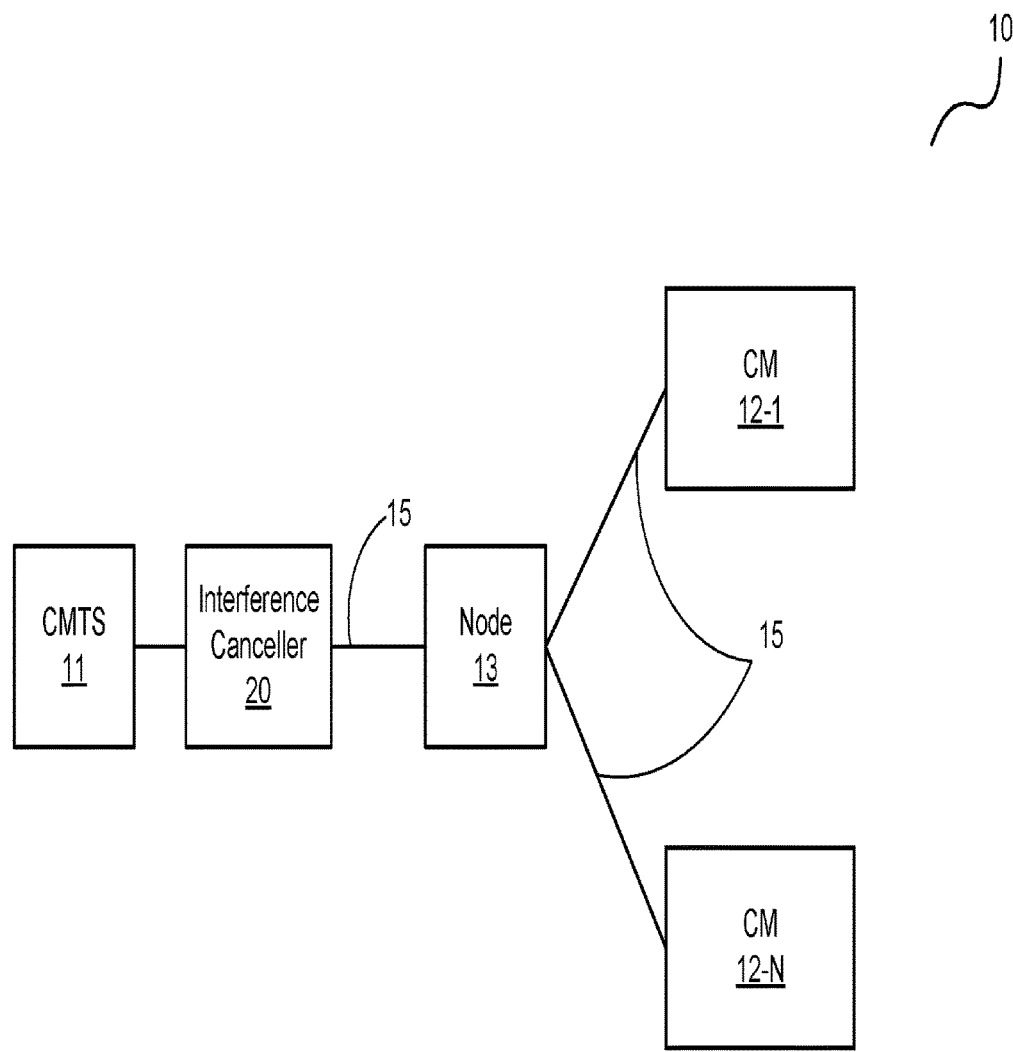
FIG. 13 is a block diagram of the exemplary communication system of FIG. 1 employing an interference canceller.
Figure 14:
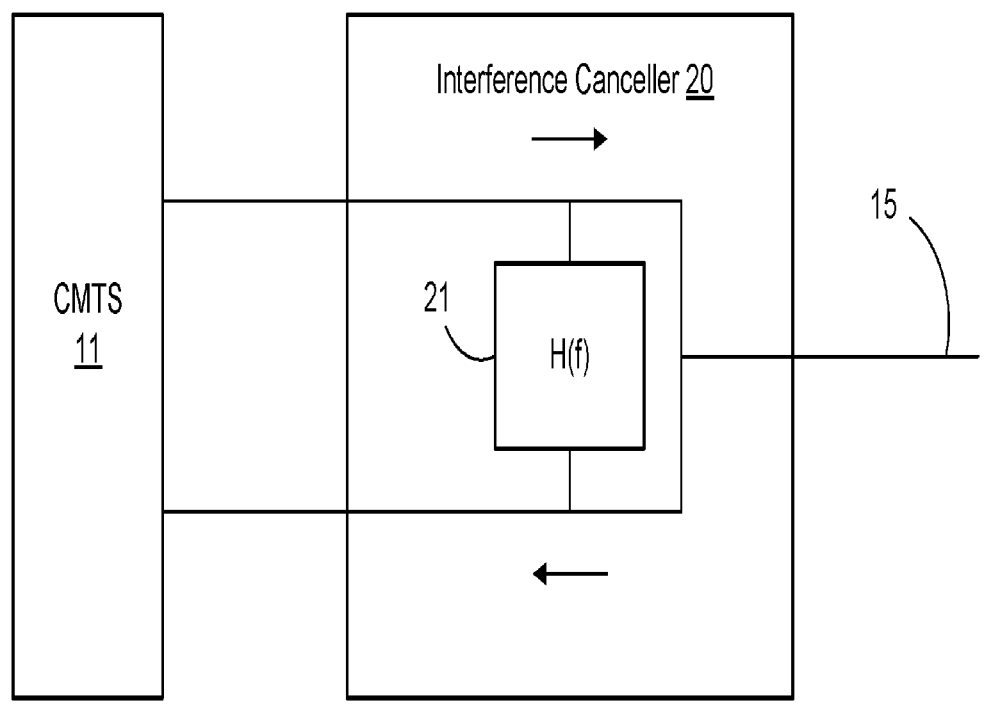
FIG. 14 is a block diagram of an exemplary interference canceller configured with a CMTS.
Figure 15:
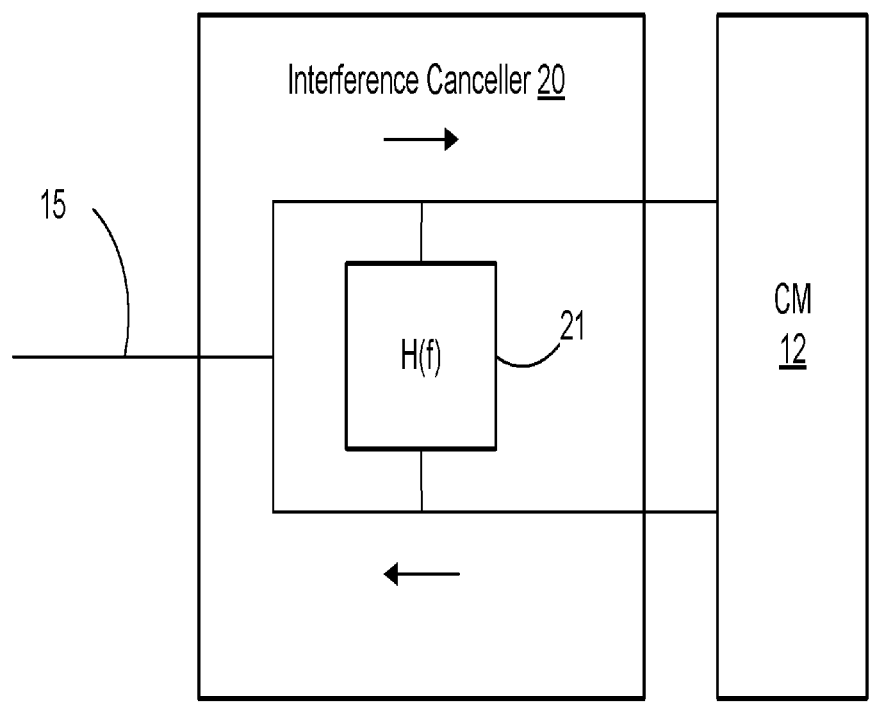
FIG. 15 is a block diagram of an exemplary interference canceller configured with a CM.

FIGS. 13 and 14 are block diagrams of the communication system 10 of FIG. 1 employing an exemplary interference canceller 20 at the CMTS 11. FIG. 15 is a block diagram of the interference canceler 20 configured at the CM 12. In these embodiments, the interference canceler 20 removes the transmitted signal from the received signal to improve duplex communications at the CMTS 11 and the CMs 12.

The interference canceler 20 generates a cancellation signal that opposes the intended transmitted signal in both magnitude in phase. For example, at any single instant of time, the energy of each frequency component at a receive port has a magnitude and phase. The transmitting device may generate a cancellation signal that has the same magnitude with a phase that differs by 180° out of phase from the transmitted signal to cancel the transmitted signal at the receive port. Generally, a wideband system generates a magnitude and phase from a single symbol while a multi-carrier system has a magnitude and phase that results from the aggregation of the magnitudes and phases of each of its carrier components.

In one embodiment, before the CMTS 11's downstream transmit signal reaches the CMTS 11's upstream receive port, it traverses a PHY cancellation component. The impact of this component in addition to the effects of other components down the network path, modify the characteristics of the downstream signal. This modified transmit downstream signal cancels the downstream signal at the receive port such that the transmit downstream signal does not interfere with the CMTS 11 reception of signals originating from other network elements (e.g., the CMs 12).

To generate the cancellation signal, the CMTS 11 may employ a digital distortion filter G(f). A transfer function H(f) 21 applies a cancellation signal at the upstream receive port of the CMTS 11. In one embodiment, the transfer function H(f) 21 is determined by means of a training/calibration process. To illustrate, Tx*H(f) generates a modified downstream signal that leaks into the upstream receive port of the cancellation module of the CMTS 11 (where Tx' is the 180° out of phase cancellation signal). The transfer function G(f) is a digitally generated distortion function that emulates the measured distortion and delay of the transfer function H(f)., The received signal Rx at the CMTS 11 is Tx*H(f)+(Tx)'*G(f)+Rx'. Assuming ideal generation of the negated downstream signal and an accurate representation of the distortion the downstream signal by G(f), this yields Tx*H(f)=−(Tx)'*G(f). The resulting signal at the CMTS 11 thus becomes Rx=Rx'.

The signal cancellation can also be employed at the CMs 12 to cancel their upstream signals from their received ports, as illustrated in FIG. 15. The interference cancellers 20 can be implemented in a variety of ways as a matter of design choice. For example, the interference cancellers 20 can be implemented as PHY cancellation circuits using RF circulators, splitters, transformers, couplers, and the like to extract the signal for which cancellation is desired.

Figure 16:
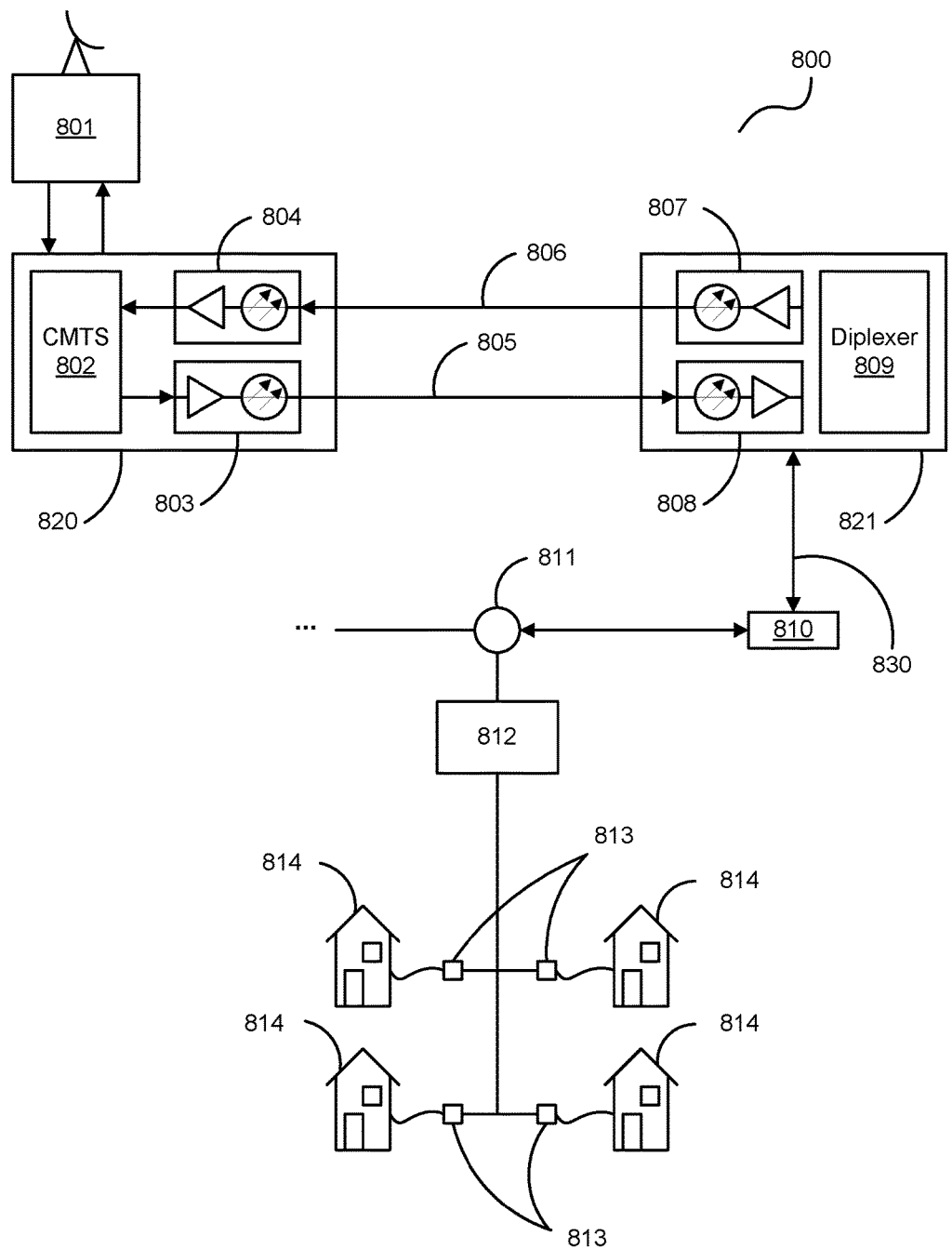
FIG. 16 is a block diagram of an exemplary communication system in which the embodiments herein may operate.

FIG. 16 is a block diagram of an exemplary communication system 800 in which the embodiments herein may operate. In this embodiment, the communication system is a cable television communication system employing an upstream link with high speed data services being delivered over devices conforming to the DOCSIS specification. The communication system includes a headend 801 configured with an upstream hub 820. The hub 820 is coupled to a fiber node 821 via optical communication links 805 and 806. The hub 820 includes a Cable Modem Termination System (CMTS) 802 (e.g., CMTS 11 of FIG. 1), an electrical to optical converter 803, and an optical to electrical converter 804. The node 821 is similarly configured with an optical to electrical converter 808 and an electrical to optical converter 807.

The headend 801 is the source for various television signals. Antennas may receive television signals that are converted as necessary and transmitted over fiber optic cables 805 to the hub 820. Several hubs may be connected to a single headend 801 and the hub 820 may be connected to several nodes 821 by fiber optic cable links 805 and 806. The CMTS 802 may be configured in the headend 801 or in the hub 820.

Downstream, in homes/businesses are devices and data terminals such as the CMs 12 of FIG. 1 (not shown). The CM acts as a host for an Internet Protocol (IP) device such as personal computer. Transmissions from the CMTS 802 to the CM are carried over the downstream portion of the cable television communication system generally in the band between 54 and 860 MHz. Downstream digital transmissions are continuous and are typically monitored by many CMs. Upstream transmissions from the CMs to the CMTS 802 are typically carried in the 5-42 MHz frequency band, the upstream bandwidth being shared by the CMs that are on-line. However, with greater demands for data, additional frequency bands and bandwidths are continuously being deployed in the downstream and upstream paths.

The CMTS 802 connects the local CM network to the Internet backbone. The CMTS 802 connects to the downstream path through an electrical to optical converter 804 that is connected to the fiber optic cable 806, which in turn, is connected to an optical to electrical converter 808 at the node 821. The signal is transmitted to a diplexer 809 that combines the upstream and downstream signals onto a single cable. The diplexer 809 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other bands are being considered to provide increased capacity.

After the downstream signal leaves the node 821, the signal is typically carried by a coaxial cable 830. At various stages, a power inserter 810 may be used to power the coaxial line equipment, such as amplifiers or other equipment. The signal may be split with a splitter 811 to branch the signal. Further, at various locations, bi-directional amplifiers 812 may boost and even split the signal. Taps 813 along branches provide connections to subscriber's homes 814 and businesses.

Upstream transmissions from subscribers to the hub 820/headend 801 occur by passing through the same coaxial cable 830 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired. In DOSCIS 3.1, OFDM modulation will be used on the downstream band of the coaxial cable and OFDMA will be used on the upstream band of the coaxial cable.

Upstream transmissions, in this embodiment, are typically sent in a frequency/time division multiplexing access (FDMA/TDMA) scheme, as specified in the DOCSIS standards. The diplexer 809 splits the lower frequency signals from the higher frequency signals so that the lower frequency, upstream signals can be applied to the electrical to optical converter 807 in the upstream path. The electrical to optical converter 807 converts the upstream electrical signals to light waves which are sent through fiber optic cable 805 and received by optical to electrical converter 803 in the node 820. The fiber optic links 805 and 806 are typically driven by laser diodes, such as Fabry Perot and distributed feedback laser diodes.

Figure 17:
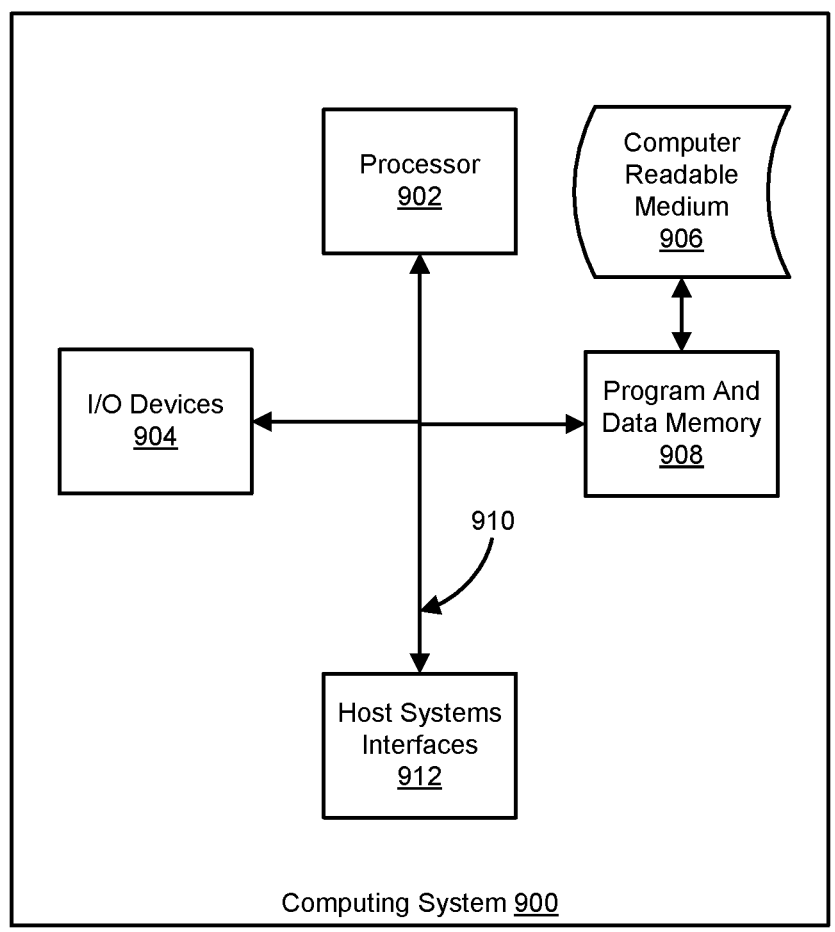
FIG. 17 is a block diagram of an exemplary computing system in which a computer readable medium provides instructions for performing methods herein.

The embodiments herein may be implemented in a variety of ways as a matter of design choice. For example software and processors performing CMTS functions could be configured in a hub or a headend facility, and the physical layer functions could be in programmable hardware in the node. In this regard, the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 17 illustrates a computing system 900 in which a computer readable medium 906 may provide instructions for performing any of the methods disclosed herein.

Furthermore, the invention can take the form of a computer program product accessible from the computer readable medium 906 providing program code for use by or in connection with a computer or any instruction execution system. For the purposes of this description, the computer readable medium 906 can be any apparatus that can tangibly store the program for use by or in connection with the instruction execution system, apparatus, or device, including the computer system 900.

The medium 906 can be any tangible electronic, magnetic, optical, electromagnetic, infrared, or semiconductor system (or apparatus or device). Examples of a computer readable medium 906 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 900, suitable for storing and/or executing program code, can include one or more processors 902 coupled directly or indirectly to memory 908 through a system bus 910. The memory 908 can include local memory employed during actual execution of the program code, bulk storage, and cache memories which provide temporary storage of at least some program code in order to reduce the number of times code is retrieved from bulk storage during execution. Input/output or I/O devices 904 (including but not limited to keyboards, displays, pointing devices, etc.) can be coupled to the system either directly or through intervening I/O controllers. Network adapters may also be coupled to the system to enable the computing system 900 to become coupled to other data processing systems, such as through host systems interfaces 912, or remote printers or storage devices through intervening private or public networks. Modems, cable modem and Ethernet cards are just a few of the currently available types of network adapters.

What is claimed is:

1. A method of operating a cable modem termination system (CMTS) in operable communication with a plurality of cable modems (CMs) over a duplex radio frequency (RF) communication path, the method comprising the steps of:
generating a measurement matrix of the plurality of CMs meeting a threshold RF isolation value, the threshold RF isolation value indicating a device to device RF isolation of a particular CM with respect to other CMs in the plurality of CMs;
determining, from the measurement matrix, which of the plurality of CMs meet a requisite RF isolation value for full duplex operation;
selecting a CM a measurement group, based on the step of determining, of CMs from the plurality of CMs; and
commencing full duplex transmission and reception with at least one CM of the measurement group.

2. The method of claim 1, wherein the step of commencing comprises a measurement sequence of the at least one CM.

3. The method of claim 2, wherein the measurement sequence is repeated to re-verify the RF isolation of the at least one CM.

4. The method of claim 2, wherein the measurement sequence is is performed in a process element of the CMTS.

5. The method of claim 4, further comprising a step of receiving, from the at least one CM over the RF communication path, a power level of the at least one CM.

6. The method of claim 5, further comprising a step of directing the at least one CM to report the received power level power level.

7. The method of claim 5, further comprising a step of collecting power level data from each CM of the plurality of CMs.

8. The method of claim 7, further comprising a step of calculating an RF isolation value between each of the plurality of CMs.

* * * * *